United States Patent
Bhaduri et al.

(10) Patent No.: US 9,580,770 B2
(45) Date of Patent: Feb. 28, 2017

(54) PROCESS FOR PREPARING A SPENT CATALYST FOR PRECIOUS METALS RECOVERY

(71) Applicants: Rahul Shankar Bhaduri, Moraga, CA (US); Hye Kyung Cho Timken, Albany, CA (US); Philip Ian Cuspard, Danville, CA (US)

(72) Inventors: Rahul Shankar Bhaduri, Moraga, CA (US); Hye Kyung Cho Timken, Albany, CA (US); Philip Ian Cuspard, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 31 days.

(21) Appl. No.: 14/521,195

(22) Filed: Oct. 22, 2014

(65) Prior Publication Data

US 2016/0115566 A1   Apr. 28, 2016

(51) Int. Cl.

| | |
|---|---|
| C22B 11/00 | (2006.01) |
| C22B 3/00 | (2006.01) |
| B01J 38/64 | (2006.01) |
| B01J 38/68 | (2006.01) |
| B01J 23/96 | (2006.01) |
| B01J 19/18 | (2006.01) |
| C22B 7/00 | (2006.01) |
| B01J 38/10 | (2006.01) |
| B01J 27/13 | (2006.01) |
| B01J 27/32 | (2006.01) |

(52) U.S. Cl.
CPC ............. *C22B 11/048* (2013.01); *B01J 19/18* (2013.01); *B01J 23/96* (2013.01); *B01J 38/64* (2013.01); *B01J 38/68* (2013.01); *C22B 7/009* (2013.01); *B01J 27/13* (2013.01); *B01J 27/32* (2013.01); *B01J 38/10* (2013.01); *B01J 2219/00177* (2013.01)

(58) Field of Classification Search
CPC .......... C22B 11/048; B01J 19/18; B01J 38/64; B01J 38/66; B01J 38/68
USPC .............. 75/732, 733, 736, 744; 423/22, 27; 502/25, 26
See application file for complete search history.

(56) References Cited

U.S. PATENT DOCUMENTS

| 4,009,103 A | 2/1977 | Burke |
| 5,160,711 A | 11/1992 | Atkinson et al. |
| 7,658,895 B2 | 2/2010 | Bhaduri |
| 7,837,960 B2 | 11/2010 | Bhaduri et al. |
| 7,846,404 B2 | 12/2010 | Bhaduri et al. |
| 8,628,735 B2 | 1/2014 | Bhaduri |
| 8,673,800 B2 | 3/2014 | Timken et al. |
| 8,815,184 B2 | 8/2014 | Bhaduri et al. |
| 8,815,185 B1 | 8/2014 | Bhaduri et al. |
| 2004/0253169 A1 | 12/2004 | Rutkowski et al. |
| 2005/0160666 A1 | 7/2005 | Fujita et al. |
| 2007/0142215 A1 | 6/2007 | Harris et al. |
| 2008/0170985 A1 | 7/2008 | Hasegawa et al. |
| 2012/0039777 A1 | 2/2012 | Bhaduri et al. |
| 2012/0076719 A1 | 3/2012 | Uchida |
| 2012/0325724 A1* | 12/2012 | Driver .................... C10G 29/26 208/262.1 |
| 2013/0209324 A1 | 8/2013 | Timken et al. |
| 2013/0211175 A1 | 8/2013 | Timken et al. |

FOREIGN PATENT DOCUMENTS

| CN | 103028423 | 4/2013 |
| GB | 718306 | 11/1954 |
| WO | 2004030789 | 4/2004 |

OTHER PUBLICATIONS

Duan, J. and Gregory, Coagulation by hydrolysing metal salts, Jul. 18, 2002, Advances in Colloid and Interface Science 100-102 (2003) 475-502, www.elsevier.com/locate/cis.
Hagelüken, C. and Verhelst, M., Recycling of precious metal catalysts, Umicore Precious Metals Refining, ptqcatalysis, 2004, www.eptq.com.
Sabin Metal Corporation, Recovery and refining of precious metals from hydrocarbon, petroleum, chemical and petrochemical processes, www.sabinmetal.com.
Rumpold, R. and Antrekowitsch, J., Recycling of platinum group metals from automotive catalysts by an acidic leaching process, The Southern African Institute of Mining and Metallurgy, Platinum 2012, pp. 695-714.
Min-seuk K., Eun-young K., Jinki J., Jae-chun L. and Wonbaek K., Recovery of Platinum and Palladium from the Spent Petroleum Catalysts by Substrate Dissolution in Sulfuric Acid, Materials Transactions, vol. 51, No. 10 (2010) pp. 1927-1933; https://www.jim.or.jp/journal/e/pdf3/51/10/1927.pdf.
Hoffmann, J.E., Recovering platinum-group metals from autocatalysts, 1988, Journal of Metals 40 (6), pp. 40-44.
US Bureau of Mines, Processing automobile catalytic converters for recovering platinum group metals, Technology News, No. 411, 1992.
Chen, J. and Huang, Ken, A new technique for extraction of platinum group metals by pressure, Hydrometallurgy 82 (2006), pp. 164-171.

* cited by examiner

*Primary Examiner* — Steven Bos
(74) *Attorney, Agent, or Firm* — Susan M. Abernathy

(57) ABSTRACT

A process is provided for preparing a spent noble metal fixed-bed catalyst for precious metals recovery, comprising: a) adding the catalyst to a caustic solution to wash the spent catalyst and to make a wash slurry having an alkaline pH, wherein the spent catalyst has been in contact with chloroaluminate ionic liquid catalyst, and wherein the spent catalyst comprises from 5 to 35 wt % chloride; and b) filtering the wash slurry and collecting: i) a filter cake having from at least 70 wt % of the chloride in the spent catalyst removed and having the noble metals retained, and ii) a wash filtrate. Also provided is a filter cake comprising a washed consolidated cake having 40 to 75 wt % solids, a cake moisture content from 25 to less than 60 wt %, 0.1 to 1.5 wt % total noble metals, and a residual chloride content of from zero to less than 4 wt %.

21 Claims, 4 Drawing Sheets

PROCESS FOR PREPARING A SPENT CATALYST FOR PRECIOUS METALS RECOVERY

This application is related to a co-filed application, titled "A METALLURGICAL EXTRACTION TECHNIQUE TO RECOVER PLATINUM GROUP METALS FROM A FILTER CAKE", herein incorporated in its entirety.

TECHNICAL FIELD

This application is directed to a process for preparing a spent catalyst for precious metals recovery, an apparatus for performing the process, and a composition of a filter cake made by the process that is suitable for precious metals recovery.

BACKGROUND

Improved processes for removal of expended ionic liquid and elevated chloride levels from spent catalyst extrudates are needed, as a precursor to precious metals recovery. Traditional means of preparing spent noble metal fixed-bed catalysts are not optimized for those spent noble metal fixed-bed catalysts that have been in contact with chloroaluminate ionic liquid catalysts. A new process is needed to reduce chloride content and retain the noble metals in the spent catalyst.

SUMMARY

This application provides a process for preparing a spent noble metal fixed-bed catalyst for precious metals recovery, comprising:
  a. adding the spent noble metal fixed-bed catalyst comprising one or more noble metals to a caustic solution to wash the spent catalyst and to make a wash slurry having a pH from 7 to 12.5, wherein the spent catalyst has been in contact with a chloroaluminate ionic liquid catalyst, and wherein the spent catalyst comprises from 5 to 35 wt % chloride; and
  b. filtering the wash slurry and collecting: i) a filter cake having from at least 70 wt % to 100 wt % of the chloride in the spent catalyst removed and having from 90 wt % to 100 wt % of the one or more noble metals retained, and ii) a wash filtrate.

This application also provides an apparatus to perform the process of claim 1, comprising:
  a. a mixing vessel used to hold the wash slurry;
  b. inlets to the mixing vessel, used to introduce the spent noble metal fixed-bed catalyst, a fresh water, and a solution of a caustic to the mixing vessel; and
  c. an outlet from the mixing vessel that feeds the wash slurry to a filtration device;
wherein the apparatus is configured to perform the process of claim 1.

This application also provides a filter cake suitable for precious metals recovery, comprising: washed consolidated cake having a % solids from 40 to 75 wt %, a cake moisture content from 25 to less than 60 wt %, 0.1 to 1.5 wt % total noble metals, and a chloride content of from zero to less than 4 wt % that is at least 80 wt % lower than an initial chloride content of a spent noble metal fixed-bed catalyst that had been in contact with a chloroaluminate ionic liquid catalyst.

The present invention may suitably comprise, consist of, or consist essentially of, the elements in the claims, as described herein.

BRIEF DESCRIPTION OF THE DRAWINGS

FIG. 1 is a drawing of an embodiment of the process and apparatus for preparing a spent catalyst for precious metals recovery.

GLOSSARY

"Ionic liquid" refers to materials consisting entirely of ions that are liquid below 100° C.

"Noble metals" refers to a group of metals that resist oxidation and corrosion in moist air. They are the opposite of the base metals, which more readily oxidize and corrode. Examples of noble metals include: ruthenium (Ru), rhodium (Rh), palladium (Pd), silver (Ag), osmium (Os), iridium (Ir), platinum (Pt), gold (Au), and rhenium (Re). Noble metals are considered precious often due to their rarity in the earth's crust, occurring naturally as elemental metals or as minerals and alloys.

"Platinum group metals" (PGMs) are six transitional metal elements that are chemically, physically and anatomically similar. PGMs include iridium (Ir), osmium (Os), palladium (Pd), platinum (Pt), rhodium (Rh), ruthenium (Ru), and mixtures thereof.

"Fixed-bed" refers to a reactor configuration wherein the catalyst particles used therein are held in place and do not move with respect to a fixed reference frame. Fixed-bed catalysts are those catalysts that are used in these fixed-bed reactors.

"Caustic solution" refers to an aqueous solution of a hydroxide of a light metal, including NaOH, KOH, and mixtures thereof.

"Directly adding" refers to the addition of one material to another material with no intervening steps.

"Alkaline pH" refers to a pH greater than 7.0, wherein pH is defined as the logarithm (base 10) of the reciprocal of the hydrogen ion activity, $a_{H^+}$, in a solution; as described in the following equation:

$$pH = -\log_{10}(a_{H^+}) = \log_{10}\left(\frac{1}{a_{H^+}}\right)$$

"Wash slurry" refers to a suspension of particles in a liquid.

"ppmw" refers to parts per million by weight. "Hydroregeneration" refers to a hydrogenation reaction used to remove contaminants such as conjunct polymer from a used ionic liquid catalyst to improve the catalyst activity.

"Filter aids" are inert materials that can be used in filtration pretreatment to improve filtration properties such as filtration rate and filter cake quality.

"Filtration device" refers to equipment that collects solids on a feed side of a filter medium while filtrate liquid is forced through the filter medium and carried away on the leeward side of the filter medium. Suitable filtration devices and filter mediums are described in "Liquid Filtration", Nicholas P. Cheremisinoff, Butterworth-Heinemann, 1998.

"Heat exchangers" refer to devices whose primary responsibility is the transfer (exchange) of heat, typically from one fluid to another.

DETAILED DESCRIPTION

FIG. 1 represents a schematic of one possible embodiment of this invention. As shown in FIG. 1, fresh water is batch added to a water cooled jacketed gently agitated mixing vessel followed by a specific volume of 50 wt % NaOH solution in water to target approximately 60 to 100 gm/L NaOH in the mixing vessel. The mixing vessel comprises a vent to a vent scrubber. Under mild agitation, spent noble metal fixed-bed catalyst (e.g., hydro-regeneration catalyst) is directly and slowly added to the mixing vessel to a level, for example, of about 20 wt % solids in the wash slurry in the mixing vessel. After the addition of the spent catalyst, about 20,000 ppmw, for example, of rice hull ash filter aid on a total solids basis is added to the wash slurry. The total solids basis is the combined spent catalyst and filter aid. The mixture of the spent catalyst, filter aid, and caustic solution is gently agitated in the mixing vessel, for example, for about 20 to 30 minutes. The pH of the wash slurry is periodically measured using a pH meter, and when the wash slurry reaches a steady pH of, for example, about 11.5, the wash slurry is pumped to a plate and frame filter press.

When the process is run in a batch mode, the first breakthrough of the press filtrate can be recycled to the mixing vessel, or a holding tank following the mixing vessel, to obviate the inclusion of suspended solids in the effluent that can be sent to a waste water treatment plant. Depending on the targeted chloride content of the filtered solids, fresh water rinsing of the solids collected in the plate and frame filter press can be applied. The solids are easily and cleanly discharged from the plate and frame filter press when the washed filter cake thickness is about, for example, 17 mm on each plate. The discharged solids are easy to handle, are consolidated, and they are especially suitable for reclaiming the one or more noble metals from them. The press filtrate liquid can be combined and sent to a waste water treatment plant. The further reclaiming of the one or more noble metals from the discharged solids can be performed at the same location as the process for preparing the spent catalyst for precious metals recovery or the discharged solids can be shipped offsite to a metals reclaimer.

Directly Adding Spent Catalyst to Make the Wash Slurry

The spent catalyst comprising one or more noble metals is added to a caustic solution to make a wash slurry having a wash slurry pH from 7 to 12.5. The caustic solution can comprise from 40 to 150 gm/L of the selected metal hydroxide in an aqueous solution, such as from 40 to 150 grams of sodium hydroxide per liter of water (corresponds to 3.85 to 14.2 wt % NaOH solution). The amount of the spent catalyst added to the caustic solution can vary from 5 to 30 wt % solids in the wash slurry. In one embodiment, the adding is done under mild agitation. In another embodiment, the adding is done slowly. The adding can be done in a manner such that an exotherm that occurs during the adding of the spent catalyst to the caustic solution is controlled to below a delta of 80° C. above ambient temperature, such as from 30 to 60° C. In one embodiment, exotherms of from zero up to 40° C. above ambient temperature occur during the adding of the spent catalyst to the caustic solution. In one embodiment, the mixing vessel is cooled to help maintain the temperature of the wash slurry, such as a temperature below 100° C. Either the passage of cool air, water, or any other coolant can be used to cool the mixing vessel. In another embodiment, the apparatus used to perform the process additionally comprises a heat exchanger to control an exotherm generated by hydrolysis in the mixing vessel. Examples of types of heat exchangers include parallel-flow, cross-flow, or countercurrent. Specific designs of heat exchangers include shell and tube, plate, regenerative, and adiabatic wheel heat exchangers.

Acidic Ionic Liquids

Acidic ionic liquids can be used as catalysts for various types of hydrocarbon conversions. Examples of these hydrocarbon conversions include: alkylation, isomerization, hydrocracking, polymerization, dimerization, oligomerization, acylation, metathesis, copolymerization, hydroformylation, dehalogenation, dehydration, and combinations thereof. In one embodiment the hydrocarbon conversion is alkylation of paraffins with olefins. Examples of ionic liquid catalysts and their use for alkylation of paraffins with olefins are taught, for example, in U.S. Pat. Nos. 7,432,408 and 7,432,409, 7,285,698, and U.S. patent application Ser. No. 12/184,069, filed Jul. 31, 2008. In one embodiment, the acidic ionic liquid is a composite ionic liquid catalyst, wherein the cations come from a hydro halide of an alkyl-containing amine or pyridine, and the anions are composite coordinate anions coming from one or more metal compounds. In another embodiment the conversion of a hydrocarbon is alkylation of paraffins, alkylation of aromatics, or combinations thereof.

The most common acidic ionic liquids are those prepared from organic-based cations and inorganic or organic anions. Ionic liquid catalysts are used in a wide variety of reactions, including Friedel-Crafts reactions.

The acidic ionic liquid is composed of at least two components which form a complex. The acidic ionic liquid comprises a first component and a second component. The first component of the acidic ionic liquid will typically comprise a Lewis acid compound selected from components such as Lewis acid compounds of Group 13 metals, including aluminum halides, alkyl aluminum dihalides, gallium halide, and alkyl gallium halide (see International Union of Pure and Applied Chemistry (IUPAC), version 3, October 2005, for Group 13 metals of the periodic table). Other Lewis acid compounds besides those of Group 13 metals may also be used. In one embodiment the first component is aluminum halide or alkyl aluminum dihalide. For example, aluminum trichloride ($AlCl_3$), aluminum tribromide ($AlBr_3$), or gallium trichloride ($GaCl_3$) may be used as the first component for preparing the ionic liquid catalyst. In one embodiment, the alkyl aluminum dihalides that can be used can have the general formula $Al_2X_4R_2$, where each X represents a halogen, selected for example from chlorine and bromine, each R represents a hydrocarbyl group comprising 1 to 12 atoms of carbon, aromatic or aliphatic, with a branched or a linear chain. Examples of alkyl aluminum dihalides include dichloromethylaluminum, dibromomethylaluminum, dichloroethylaluminum, dibromoethylaluminum, dichloro n-hexylaluminum, dichloroisobutylaluminum, either used separately or combined.

The second component making up the acidic ionic liquid is an organic salt or mixture of salts. These salts may be characterized by the general formula Q+A−, wherein Q+ is an ammonium, phosphonium, boronium, oxonium, iodonium, or sulfonium cation and A− is a negatively charged ion such as Cl⁻, Br⁻, ClO$_4^-$, NO$_3^-$, BF$_4^-$, BCl$_4^-$, PF$_6^-$, SbF$_6^-$, AlCl$_4^-$, Al$_2$Cl$_7^-$, Al$_3$Cl$_{10}^-$, GaCl$_4^-$, Ga$_2$Cl$_7^-$, Ga$_3$Cl$_{10}^-$, AsF$_6^-$, TaF$_6^-$, CuCl$_2^-$, FeCl$_3^-$, AlBr$_4^-$, Al$_2$Br$_7^-$, Al$_3$Br$_{10}^-$, SO$_3$CF$_3^-$, and 3-sulfurtrioxyphenyl. In one embodiment the second component is selected from those having quaternary ammonium halides containing one or more alkyl moieties having from about 1 to about 9 carbon atoms, such as, for example, trimethylammonium hydrochloride, methyltributylammonium, 1-butyl pyridinium, or alkyl substituted imidazolium halides, such as for example, 1-ethyl-3-methylimidazolium chloride.

In one embodiment, the acidic ionic liquid comprises an unsubstituted or partly alkylated ammonium ion.

In one embodiment, the acidic ionic liquid is chloroaluminate or a bromoaluminate. In one embodiment the acidic ionic liquid is a quaternary ammonium chloroaluminate ionic liquid having the general formula RR' R" N H$^+$ Al$_2$Cl$_7^-$, wherein R, R', and R" are alkyl groups containing 1 to 12 carbons. Examples of quaternary ammonium chloroaluminate ionic liquids are an N-alkyl-pyridinium chloroaluminate, an N-alkyl-alkylpyridinium chloroaluminate, a pyridinium hydrogen chloroaluminate, an alkyl pyridinium hydrogen chloroaluminate, a di alkyl-imidazolium chloroaluminate, a tetra-alkyl-ammonium chloroaluminate, a tri-alkyl-ammonium hydrogen chloroaluminate, or a mixture thereof.

The presence of the first component should give the acidic ionic liquid a Lewis or Franklin acidic character. Generally, the greater the mole ratio of the first component to the second component, the greater is the acidity of the acidic ionic liquid.

For example, a typical reaction mixture to prepare n-butyl pyridinium chloroaluminate ionic liquid is shown below:

In one embodiment, the acidic ionic liquid comprises a monovalent cation selected from the group consisting of a pyridinium ion, an imidazolium ion, a pyridazinium ion, a pyrazolium ion, an imidazolinium ion, a imidazolidinium ion, a phosphonium ion, and mixtures thereof.

In one embodiment, the hydrocarbon conversion utilizes a co-catalyst to provide enhanced or improved catalytic activity. A co-catalyst can comprise, for example, anhydrous HCl or organic chloride (see, e.g., U.S. Pat. No. 7,495,144 to Elomari, U.S. Pat. No. 7,531,707 to Harris et al., and U.S. Pat. No. 8,674,159 to Hommeltoft) When organic chloride is used as the co-catalyst with the acidic ionic liquid, HCl may be formed in situ in the apparatus either during the hydrocarbon conversion process or during post-processing of the output of the hydrocarbon conversion.

Acidic ionic liquid catalyzed hydrocarbon conversion products and the other outputs from the hydrocarbon conversion can include one or more halogenated components, as disclosed in U.S. Pat. No. 8,586,812. Halogenated components and HCl can contribute to excess corrosion of apparatuses used with chloroaluminate ionic liquid catalysts. In one embodiment, the hydrocarbon conversion is conducted in the presence of a hydrogen halide, e.g., HCl or HBr.

Noble Metal Fixed-Bed Catalyst

The spent noble metal fixed-bed catalyst that has been in contact with a chloroaluminate ionic liquid catalyst comprises one or more noble metals that are desired for recovery. In addition it comprises a undesirably high level of chloride, such as greater than 4 wt %, or from 5 to 35 wt % chloride.

In one embodiment, the spent noble metal fixed-bed catalyst comprises one or more platinum group metals.

In one embodiment, the noble metal fixed-bed catalyst comprises one or more noble metals on a support. In addition to the noble metals or platinum group metals, other metal or non-metal hydrogenation components may be present in the spent noble metal fixed-bed catalyst. Examples of other metal hydrogenation components, for example, that can be used are Fe, Co, Ni, Cr, Mn, Ti, V, Zr, Mo, W, and mixtures thereof. Examples of non-metal hydrogenation components include Te, As, Sn, S, and mixtures thereof. The various hydrogenation components can be used singly or in combination.

Examples of supports can include kieselguhr, alumina, silica, and silica-alumina. Other supports include alumina-boria, silica-alumina-magnesia, silica-alumina-titania and materials obtained by adding zeolites and other complex oxides thereto. In one embodiment, the support is porous, and comprises a natural clay or a synthetic oxide. The support can be selected to provide adequate mechanical strength and chemical stability at the reaction conditions under which the noble metal fixed-bed catalyst is employed.

In one embodiment, zeolites or molecular sieves are included in the noble metal fixed-bed catalyst to improve the catalyst's performance, for example to improve the catalyst's performance for hydro-regeneration.

In one embodiment, the spent noble metal fixed-bed catalyst is in the form of extruded pellets (extrudates) and has an extruded pellet diameter of 10 mm or less, such as from 1.0 to 5.0 mm. In one embodiment, the extruded pellet has a length-to-diameter ratio of 1 to 10. Examples of other types and sizes of pellets used for spent noble metal fixed-bed catalysts are 1 to 10 mm diameter spheres; 1 to 10 mm diameter cylinders with a length-to-diameter ratio of 1 to 4; and up to 10 mm diameter hollow cylinders or rings.

Hydro-Regeneration of Chloroaluminate Ionic Liquid Catalyst

Chloroaluminate ionic liquid catalysts used for hydrocarbon conversions become deactivated during use and require regeneration. The deactivation can be caused by, for example, the build-up of conjunct polymer or other impurities in the chloroaluminate ionic liquid catalyst. Regeneration can be achieved in a hydro-regeneration reactor using a hydro-regeneration catalyst. The hydro-regeneration reactor contacts the used chloroaluminate ionic liquid catalyst with hydrogen and the hydro-regeneration catalyst to reactivate the used chloroaluminate ionic liquid catalyst. The hydro-regeneration removes the impurities, such as conjunct polymer, from the used chloroaluminate ionic liquid catalyst, thus increasing the acidity and ability of the chloroaluminate ionic liquid catalyst to perform hydrocarbon conversions.

In one embodiment, the hydro-regeneration reaction conditions are performed over a range of hydrogen pressures, for example from about 50 to 5,000 psig. Hydro-regeneration conditions can include temperatures of −20° C. to 400° C., or 50° C. to 300° C.; and total pressures of atmospheric to 5,000 psig, or 50 to 2,500 psig. Hydro-regeneration contact times with the used chloroaluminate ionic liquid catalyst can be from 0.1 minute to 24 hours, such as 10 minutes to 12 hours. Ratios of hydrogen feed to used chloroaluminate ionic liquid catalyst during the hydro-regeneration can vary from 0.1 to 10 vol/vol/hour (liquid hourly space velocity, LHSV). A normal hydrocarbon can optionally be used as a solvent in the hydro-regeneration reactor.

Examples of hydro-regeneration of chloroaluminate ionic liquid catalysts, for example, are given in U.S. Pat. No. 7,691,771, U.S. Pat. No. 7,651,970, U.S. Pat. No. 7,678,727, U.S. Pat. No. 7,825,05; and in US Patent Pub. Nos. 20140037512A1, 20140039231A1, 20140066678A1, 201400134065A1, and 20140179977A1.

The noble metal fixed-bed catalyst becomes spent over time in service, and is periodically replaced. The spent catalyst that is removed from the fixed-bed reactor still comprises the one or more noble metals that are valuable and are desired for recovery.

Filter Cake

In one embodiment, the filter cake has a washed filter cake thickness from greater than 5 to 25 mm. In one embodiment, the filter cake can have a washed filter cake thickness of 10 to 25 mm. A suitable washed filter cake thickness is one that provides a suitable flow rate during filtering and accumulates sufficient solids over a reasonable length of time.

High chloride levels in a filter cake can be corrosive to materials of construction used for subsequent pyrometallurgical recovery of the noble metals. The filter cake has at least 70 wt % to 100 wt % of the chloride from the spent catalyst removed from it. In one embodiment, the filter cake comprises from 0 to 5 wt % residual chloride, such as from 0 to less than 4 wt % residual chloride. In one embodiment, the washed filter cake is not water reactive.

The filter cake has from 90 to 100 wt % of the one or more noble metals retained, making it economical for subsequent recovery of the noble metals.

In one embodiment, the filter cake has a cake moisture content of less than 60 wt % and exhibits no thixotropic properties. For example, the filter cake can have a cake moisture content from 25 to 60 wt %. In one embodiment the filter cake is not sticky and easily discharges from the filtration device.

In one embodiment, the process comprises consolidating the collected filter cakes. In one embodiment, the washed consolidated cake is no longer water reactive. In one embodiment, the process produces a filter cake suitable for precious metals recovery, comprising: washed consolidated cake having a percent solids content from 40 to 75 wt %, a cake moisture content from 250 to less than 60 wt %, 0.1 to 1.5 wt % total noble metals, and a chloride content of from zero to less than 4 wt % that is at least 80 wt % lower than an initial chloride content of a spent noble metal fixed-bed catalyst that had been in contact with a chloroaluminate ionic liquid catalyst. When additional rinsing is used in the process, a washed consolidated cake can be produced having a chloride content that is 90 to 100 wt % lower than the initial chloride content of the spent noble metal fixed-bed catalyst.

Filtration and Filter Aids

The filtration device used for filtering the wash slurry comprises a filter medium with suitable pore sizes to provide effective liquid solid separation. In one embodiment the pore sizes in the filter medium can vary over a range from 1 to 100 microns, such as from 5 to 70 microns, or from 15 to 44 microns. In one embodiment, the filter medium comprises a filter cloth, a filter paper, or a wire mesh. In one embodiment, the filter medium is resistant to alkali or acid. Examples of filter cloths using synthetic polymeric fibers that are resistant to alkali, for example, can be Aerilan, Dynel, Nylon, Saran, or Teflon.

Examples of different filtration devices are bag filters, cartridge filters, plate and frame filter presses, and clean-in-place (CIP) filters. In one embodiment the filtration device comprises a plate and frame filter press having perforated or slotted plates of steel, bronze, titanium, or other alloys. A plate and frame filter press can handle larger volumes of wash slurry, effectively support the collected filter cake, as well as provide easy removal of the filter cake.

In one embodiment, the process additionally comprises adding a filter aid to the wash slurry. When used, there are two objectives related to the addition of filter aids to a medium that is being filtered. One is to form a layer of a second medium which protects the basic medium of the system. This is commonly referred to as "pre-coat" filter aid. The second objective of filter aids is to improve the flow rate during filtration by decreasing cake compressibility and increasing cake permeability. This type of usage is termed as "admix" filter aid or "body feed" filter aid. Pre-coat filter aids, admix filter aids, or mixtures thereof can be used.

Examples of filter aids include diatomaceous earth (DE), fly ash, perlite, cellulose, calcined rice hull ash, and fibers from used paper products (such as newspaper).

Diatomaceous earth, also known as D.E., diatomite, or kieselgur/kieselguhr, is a naturally occurring, soft, siliceous sedimentary rock that is easily crumbled into a fine white to off-white powder. Diatomaceous earth can have a particle size ranging from less than 3 micrometres to more than 1 millimetre, but typically from 10 to 200 micrometres. Depending on the granularity, this powder of diatomaceous earth can have an abrasive feel, similar to pumice powder, and can have a low density as a result of its high porosity. The typical chemical composition of oven-dried diatomaceous earth is 80 to 90% silica, with 2 to 4% alumina (attributed mostly to clay minerals) and 0.5 to 2% iron oxide.

Examples of calcined rice hull ash filter aids are the MaxFlo® family of filter aids. MaxFlo® is a registered trademark of the Agrilectric Research Company. The MaxFlo® family of filter aids is based on amorphous silica, and they comprise an amorphous silica by-product of burning rice hulls for energy generation. In one embodiment, the rice hull ash filter aid comprises greater than 90 wt % amorphous silicon dioxide and less than 1 wt % crystalline silica. In one embodiment, the rice hull ash filter aid has a pH of 6.5 to 8.0.

In one embodiment, the filter aid comprises at least 25 wt % silica, such as from 50 to 98 wt % silica, or 70 to 99 wt % silica. In one embodiment, the filter aid comprises less than 80 wt % crystalline silica.

In one embodiment, an amount of filter aid added to the wash slurry is greater than 15,000 ppmw, on a total solids basis. In another embodiment, the amount of filter aid added to the wash slurry is from 10,000 to 30,000 ppmw, on a total solids basis.

Water Usage

It can be desired to keep an amount of wash filtrate to a minimum to avoid excessive water usage and reduce waste water treatment and disposal costs. In one embodiment, an amount of water used to wash the filter cake is from 0.20 to 1.00 gallons (0.76 to 3.785 liters) of water per pound (0.4536 kilogram) of the spent catalyst. In another embodiment, the total amount of water used to wash and rinse the filter cake is less than 1.00 gallons (3.785 liters) per pound (0.4536 kilogram) of the spent catalyst.

Filter Wash Flux Rate

In one embodiment, the filtering of the wash slurry is done at a filter wash flux rate of 3.0 to 12.0 liters per minute per square meter (Lpm/m$^2$). In one embodiment, the filter wash flux rate during the filtering is from 3.5 to 7.0 Lpm/m$^2$. These are effective ranges of filter wash flux rates for operating filtration devices commercially.

In one embodiment, the wash filtrate pH is maintained above 7.0 to improve the filter wash flux rate. For example, the wash filtrate pH can be from 7.0 to 12.5. In one embodiment, the wash filtrate pH is maintained from 9.0 to 12.0.

In one embodiment, a time between the directly adding of the spent catalyst to the caustic solution and the filtering of the wash slurry is less than 5 hours, such as 10 to 60 minutes.

Metallurgical Extraction of Noble Metals

In one embodiment, the process for preparing the spent catalyst for precious metals recovery additionally comprises reclaiming the one or more noble metals using a metallurgical extraction technique.

Examples of metallurgical extraction techniques include:
A. Pyrometallurgical extraction by electric arc or induction plasma arc furnace smelting at temperatures of 1,600° C. to 2,000° C., with appropriate fluxes to slag out alumina, silica and other impurities. A collector metal, such as copper or iron is added to selectively appropriate the noble metals, such as platinum group metals, into a molten collector solution. This technique is analogous to a high temperature washing process where liquid metal is used as a detergent. The liquid metal alloy from the technique can be fragmented in air or water into smaller pellets to augment the surface area for rapid dissolution of the collector metal in sulfuric acid. The undissolved residue of noble metals can be further purified via additional smelting or hydrometallurgical techniques.
B. For spent catalysts comprising Pt or Pd, or combinations thereof, on γ-alumina support, hydrometallurgical extraction using caustic treatment can be used to solubilize aluminum and release the platinum group metals for recovery. Dissolution of the Pt or Pd residue can be achieved with an acid treatment using HCl—H$_2$O$_2$ (hydrochloric-peroxide) or HNO$_3$—HCl (aqua regia). Alternatively, or additionally, the solubilized platinum group metals can be separated from each other via solvent extraction (SX) using amine extractants or via ion-exchange (IX) resins.
C. An alternative hydrometallurgical extraction that comprises re-pulping, grinding, and leaching the filter cake in a hot alkaline cyanide solution to provide dissolved platinum group metals, liquid-solid separation of the dissolved platinum group metals, and recovering the dissolved platinum group metals using a strong base anion exchange resin or by cementation with cementation metals comprising aluminum or zinc. The grinding is done in a mill. Every mill has a throughput versus recovery curve—based on different target grind sizes often expressed as P80 i.e., 80% probability of particles being under a certain size when they exit. In one embodiment the grinding of the filter cake is to a P80 of 50 to 100 microns, such as a P80 of 74.

The following cyanidation-cementation reactions are projected for the alternative hydrometallurgical extraction using aluminum metal described above:

PtO$_2$+6NaCN+2H$_2$O=Na$_2$[Pt(CN)$_6$]+4NaOH

PdO+4NaCN+H$_2$O=Na$_2$[Pd(CN)$_4$]+2NaOH

3[Pt(CN)$_6$]$^{2-}$+4Al+16OH$^-$=3Pt↓+18CN$^-$+4AlO$_2^-$+ 8H$_2$O

3[Pd(CN)$_4$]$^{2-}$+2Al+8OH$^-$=3Pd↓+12CN$^-$+2AlO$_2^-$+ 4H$_2$O

EXAMPLES

Example 1

Production of Spent Hydro-Regeneration Catalyst

Various ionic liquid catalysts made of metal halides, such as AlCl$_3$, AlBr$_3$, GaCl$_3$, GaBr$_3$, InCl$_3$, and InBr$_3$ could be used for catalytic processes. N-butylpyridinium chloroaluminate (C$_5$H$_5$NC$_4$H$_9$Al$_2$Cl$_7$) was the ionic liquid catalyst used in our process. Per Table 1, the ionic liquid catalyst has the following composition:

TABLE 1

| Composition of Ionic Liquid Catalyst | |
|---|---|
| Element | Wt % |
| Al | 12.4 |
| Cl | 56.5 |
| C | 24.6 |
| H | 3.2 |
| N | 3.3 |

Refinery isobutane contain 85 wt % isobutane and 15 wt % n-butane was used for this study. A refinery olefin stream containing C$_3$ and C$_4$ olefins from a Fluid Catalytic Cracking Unit (FCC unit) was dried with 13× molecular sieve and isomerized with a Pd/Al$_2$O$_3$ catalyst at 150° F. and 250 psig in the presence of hydrogen to produce isomerized C$_3$ and C$_4$ olefin feed with the composition shown in Table 2.

TABLE 2

| Composition of Isomerized C$_3$ and C$_4$ Olefin Feed | |
|---|---|
| Composition | Mole % |
| Propane, C3 | 13.3 |
| Propylene, C3= | 25.4 |
| 1-Butene, 1-C4= | 2.3 |
| 2-Butene, 2-C4= | 16.2 |
| Isobutylene, i-C4= | 6.7 |
| n-Butane, nC4 | 12.4 |
| Isobutane, iC4 | 22.2 |
| C5+ | 1.6 |
| Sum | 100.0 |

Evaluation of the alkylation of the isomerized C$_3$ and C$_4$ olefin feed with isobutane was performed in a continuously stirred tank reactor. An 8:1 molar mixture of isobutane and olefin was fed to the reactor while vigorously stirring. The ionic liquid catalyst was fed to the reactor via a second inlet port targeted to occupy 4 vol % in the reactor. A small amount of n-butyl chloride was added to produce anhydrous HCl in situ. The average residence time in the reactor (combined volume of feeds and catalyst) was about 12 minutes. The outlet pressure was maintained at 200 psig and the reactor temperature as maintained at 95° F. (35° C.) using external cooling.

The reactor effluent was separated with a coalescing separator into a hydrocarbon phase and an ionic liquid catalyst phase. The hydrocarbon phase was sent to a distillation section to produce multiple streams, including: a $C_3^-$ fraction, an $iC_4$ stream, an $iC_4$ stream, and an alkylate stream. The $iC_4$ stream was recycled back to the alkylation reactor.

About 80 wt % of the ionic liquid catalyst was directly recycled back to the alkylation reactor for repeated use. To maintain the activity of the ionic liquid catalyst, about 20 wt % of the used ionic liquid catalyst was sent to a hydrogenation reactor for reduction of the conjunct polymer level in the ionic liquid catalyst (hydro-regeneration). The conjunct polymer level of the ionic liquid catalyst was maintained at 2 to 5 wt % level with the hydro-regeneration and good alkylate gasoline properties were obtained. The amount of conjunct polymer in the ionic liquid catalyst was determined using an FT-IR quantitation method described in US patent publication No. 20120296145A1.

The hydro-regeneration catalyst contained Pt and Pd hydrogenation metals on alumina extrudate support. The hydro-regeneration catalyst was kept in operation for 7 months to regenerate the ionic liquid catalyst, and then the hydrogenation unit was shut down. Residual ionic liquid catalyst in the hydrogenation catalyst bed was removed as much as possible by blowing with $H_2$ gas, followed by a thorough isobutane flush, and then a dry $N_2$ purge. The hydrogenation reactor was opened to the atmosphere by opening the top of the reactor vessel and the spent catalyst was vacuumed out. The spent hydro-regeneration catalyst was stable (not highly reactive with moisture in the air), and it was stored in a closed container with a plastic liner until it was used for metals reclamation studies.

The properties of the fresh ionic liquid catalyst, the fresh hydro-regeneration catalyst, and the spent hydro-regeneration catalyst are shown in Table 3. The metals analyses was performed using digestion techniques followed by inductively coupled plasma (ICP) analysis, the weight percent of C, H, and N was measured with a Carlo-Erba combustion analysis equipment, and the weight percent of S was measured with a Leco combustion analysis equipment. The chloride contents were measured by hydrolyzing the samples in a diluted alkaline solution followed by chloride content determination using a chloride ion-selective-electrode.

TABLE 3

Properties of Fresh Ionic Liquid Catalyst, and Fresh and Spent Hydro-Regeneration Catalysts

| | Fresh Ionic Liquid Catalyst | Fresh Hydrogenation Catalyst | Spent Hydrogenation Catalyst |
|---|---|---|---|
| ICP Test for Metals Analysis | | | |
| Pt, wt % | 0 | 0.18 | 0.11 |
| Pd, wt % | 0 | 0.36 | 0.24 |
| Al, wt % | 12.4 | 49.1 | 25.1 |
| Cu, wt % | 0 | 0 | 0.31 |
| Fe, wt % | 0 | 0.01 | 0.05 |
| Ni, wt % | 0 | 0 | 0.96 |
| Sulfur Analysis with Leco Analyzer | | | |
| S, % | 0 | 0 | 0.42 |
| Carlo-Erba Combustion Analysis | | | |
| C, wt % | 24.6 | 0 | 13.1 |
| H, wt % | 3.2 | 0 | 1.94 |
| N, wt % | 3.3 | 0 | 1.49 |
| Cl Analysis with Cl Selective Electrode | | | |
| Cl, wt % | 56.5 | 0 | 25.3 |
| Sum | 100.0 | 49.7* | 69.0* |

*The summation of fresh & spent hydro-regeneration catalysts was less than 100% since oxygen in the alumina binder was not included in the measurements.

The data shown in Table 3 suggested that the hydro-regeneration catalyst had some corrosion metals, such as Cu, Fe, and Ni, accumulating over the 7 months of operation. The amount of C, H, N, and Cl analysis indicated that the spent hydro-regeneration catalyst contained a substantial amount of trapped ionic liquid catalyst. Based on the above elemental analysis, an estimated 30-40 wt % of the spent hydro-regeneration catalyst was trapped ionic liquid catalyst.

The unloaded hydro-regeneration catalyst consisted of solid extrudates with good integrity and no ionic liquid visibility on the external surface. Based on this, it was concluded that the ionic liquid catalyst resided in the pores and in the void space inside the extrudates and that $N_2$ purging and isobutane flushing steps incorporated for the shutdown/unloading process could not remove the ionic liquid trapped inside the spent hydro-regeneration catalyst extrudate pores.

Even though the extent was less severe, the spent hydro-regeneration catalyst still showed the reactivity behavior of the ionic liquid catalyst in that the spent hydro-regeneration catalyst reacted slowly with moisture in the atmosphere and evolved some HCl gas. When the hydro-regeneration catalyst was added to water, rapid hydrolysis of ionic liquid occurred and heat was generated due to the hydrolysis.

Based on this residual reactivity behavior, it was concluded that the spent hydrogenation catalyst could not be handled as-is by the noble metals reclamation facility since HCl evolution might affect operational personnel at the facility and/or damage the equipment used for the noble metal recovery process.

Example 2

Comparative Process Using Spent Catalyst Addition to Deionized Water

Spent 1/16" diameter catalyst pellets, comprising Pt and Pd on an alumina support, were collected from the hydro-regeneration reactor (described above) used to regenerate acidic chloroaluminate ionic liquid catalyst that was in turn used for olefin and isoparaffin alkylation to make alkylate gasoline blending component.

On contact with air, the spent catalyst pellets released hydrochloric acid fumes. The spent catalyst pellets were added to deionized water and significant exotherms from 50 to 75° C. above ambient temperature were released and an acidic slurry with a pH of less than 3 was formed. It is theorized that the presence of residual chloroaluminate ionic liquid catalyst caused rapid hydrolysis in water to aluminum hydroxide, along with the release of exotherms.

The acidic slurry was agitated, allowed to settle, and vacuum filtrated using a Buchner funnel to produce a filter cake. The acidic slurry was difficult to filter, as gelatinous aluminum hydroxide solids and generated spent catalyst fines blinded the filter media. The spent catalyst pellets eroded during the washing sequence, creating spent catalyst fines to greater than 15 wt % passing 20-mesh Tyler and greater than 0.5 wt % passing 100-mesh Tyler.

Additional water was used to rinse the filter cake, and this produced a rinsed filter cake. The spent catalyst wash and rinse filtrates were also separately collected for analysis.

Splits of selected vacuum filtered filtrates were assayed for metal content using a Thermo Fisher Scientific, Iris Advantage Inductively Coupled Plasma (ICP) spectrometer and a Perkin Elmer 6000 ICP-Mass Spectrometer. Anionic species were analyzed for chlorides either by titration and or by ion chromatography on a Dionex IC 25 unit with a carbonate/bicarbonate eluent system on As-12 columns. Selected splits of head and tail solids underwent borate fusion and/or were digested in acid and assayed for base and precious metal content via ICP.

The spent catalyst pellets, as collected, and the thoroughly rinsed filter cake had the following compositions, as shown in Table 4.

TABLE 4

|  | Spent Hydro-regeneration Catalyst | Hydrolyzed/Rinsed Hydro-regeneration Catalyst |
|---|---|---|
| ICP Test for Metals Analysis |  |  |
| Pt, wt % | 0.11 | 0.11 |
| Pd, wt % | 0.24 | 0.24 |
| Al, wt % | 25.1 | 43.1 |
| Cu, wt % | 0.31 | 0.25 |
| Fe, wt % | 0.05 | 0.06 |
| Ni, wt % | 0.96 | 1.7 |
| Sulfur Analysis with Leco Analyzer |  |  |
| S, % | 0.42 | 0.51 |
| Carlo-Erba Combustion Analysis |  |  |
| C, wt % | 13.1 | 23.0 |
| H, wt % | 1.94 | 4.1 |
| N, wt % | 1.49 | 0.1 |
| Cl Analysis with Cl Selective Electrode |  |  |
| Cl, wt % | 25.3 | 1.1 |
| sum | 69.0* | 74.3* |

*The summation of spent & washed hydro-regeneration catalysts was less than 100% since oxygen in the alumina binder was not included in the measurements.

The washed and rinsed filter cake retained the Pt and Pd, together with base metal impurities as insoluble hydroxides. The washed and rinsed filter cakes were no longer water-reactive. However the washed and rinsed filter cake contained gels and filtration was extremely difficult.

Example 3

Process Using Spent Catalyst Addition to Deionized Water Followed by Caustic Treatment The spent hydro-regeneration catalyst pellets described in Example 1 were added to deionized water at a concentration of 33 wt % solids in water and tumbled on a roller unit for 20 minutes. As in Example 2, significant exotherms from 50 to 70° C. above ambient temperature were released and an acidic spent catalyst slurry with a pH of less than 3 was formed. To the spent catalyst slurry a caustic solution of NaOH was added to 20-weight percent solids.

In a series of experiments, the NaOH dosage added to the spent catalyst slurry was varied from 303 gm/L to 111 gm/L. After the addition of the caustic solutions, the spent catalyst slurries were gently tumbled for an additional 10 minutes, followed by solids settling and vacuum filtration (3 psia) through a 9 cm. Buchner funnel with 8 micron pore Whatman paper.

In these experiments, aluminum hydroxide colloidal gels formed only when the pH of the wash slurry was less than 7. When present, these gels reduced the washed filter cake homogeneity and created thixotropic solids that compounded filter plugging and had very poor filter press discharge attributes.

The filter wash flux rate in liters per minute per square meter ($Lpm/m^2$), the wash filtrate pH, and the washed filter cake thickness were measured and are summarized below in Table 5.

TABLE 5

Filtration Rate and pH of the Hydrolyzed Hydro-regeneration Catalyst Slurry as a Function of Final Slurry pH

| NaOH (gm/L) | Filter Wash Flux Rate ($Lpm/m^2$) | Wash Filtrate pH (Standard Units) | Washed Filter Cake Thickness (mm) |
|---|---|---|---|
| 303 | 5.5 | 12.97 | 4 |
| 187 | 11.4 | 12.23 | 4 |
| 175 | 9.0 | 12.07 | 4 |
| 160 | 7.0 | 10.85 | 4 |
| 148 | 7.9 | 10.39 | 4 |
| 111 | 1.4 | 4.02 | 4 |

The filter wash flux rate was improved significantly when the wash filtrate pH was maintained from 7.0 or higher.

Figure 2:
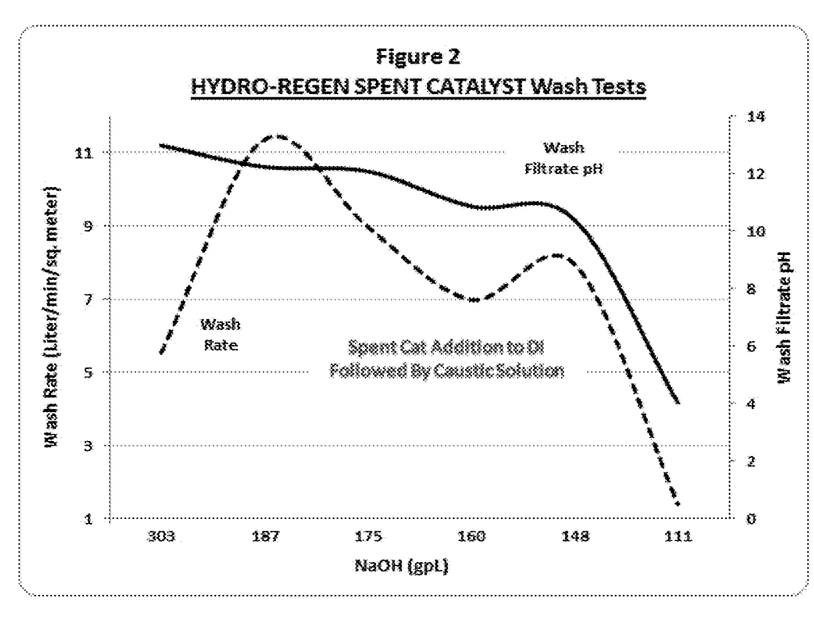
FIG. 2 summarizes the results of experiments of a process using spent catalyst addition to deionized water followed by caustic treatment.

A graph of the results that were obtained in this example is shown in FIG. 2. As shown in FIG. 2, the optimal filtration was obtained at about 187 gm/L NaOH (12.23 pH), with a filter wash flux rate of 11.4 $Lpm/m^2$, and at a washed filter cake thickness of only 4 mm. At the optimal filtration conditions in this example, approximately 90 wt % of the chloride in the spent catalyst pellets was removed. The filtration rate was optimal when the wash filtrate pH was from 7 to 12.5, and further improved when the wash filtrate pH was from 9 to 12. An additional step of water rinsing of the washed cake improved chloride removal to between 90% and 100%.

The spent catalyst wash and rinse filtrates had the following compositions, as shown in Table 6.

TABLE 6

Composition of Filtrate

| Element | Wash Filtrate (wt %) | Rinse Filtrate (wt %) |
|---|---|---|
| Al | 0.32 | — |
| Cl | 5.91 | 0.99 |
| Na | 3.96 | 0.77 |
| S | 0.010 | 0.002 |

The results shown in Table 6 indicated that water reactive chloride was converted to non-water reactive NaCl and dissolved in the liquid phase. The soluble Al in the wash filtrate solution was produced from the $AlCl_3$ associated with the trapped ionic liquid which was dissolved in the water phase as $AlCl_3$ hydrate.

Example 4

Process Using Spent Catalyst Addition Directly to Caustic Solution

The spent catalyst pellets described in Example 1 were directly added at 20 wt % solids to a range of NaOH solutions. Unlike in the earlier Examples, exotherms of less than 30° C. above ambient temperature were released. The mixtures of spent catalyst pellets and NaOH solution (spent catalyst slurry) were tumbled on a roller unit for 20 minutes, followed by solids settling and vacuum filtration (3 psia) through a 9 cm. Buchner funnel with 8 micron pore paper. The NaOH dosage was varied from 188 gm/L to 53 gm/L. Whatman filter paper having an 8-micron pore size was used to reduce any loss of catalyst fines.

The filter wash flux rate, in liters per minute per square meter ($Lpm/m^2$), the wash filtrate pH, and the wash cake thickness were measured and are summarized below in Table 7.

TABLE 7

| NaOH (gm/L) | Filter Wash Flux Rate ($Lpm/m^2$) | Wash Filtrate pH (Standard Units) | Washed Filter Cake Thickness (mm) |
|---|---|---|---|
| 188 | 3.8 | 12.92 | 4 |
| 175 | 4.3 | 13.14 | 4 |
| 161 | 5.1 | 13.12 | 4 |
| 99  | 7.2 | 12.30 | 4 |
| 75  | 9.7 | 11.79 | 4 |
| 53  | 1.9 | 3.31  | 4 |

Figure 3:
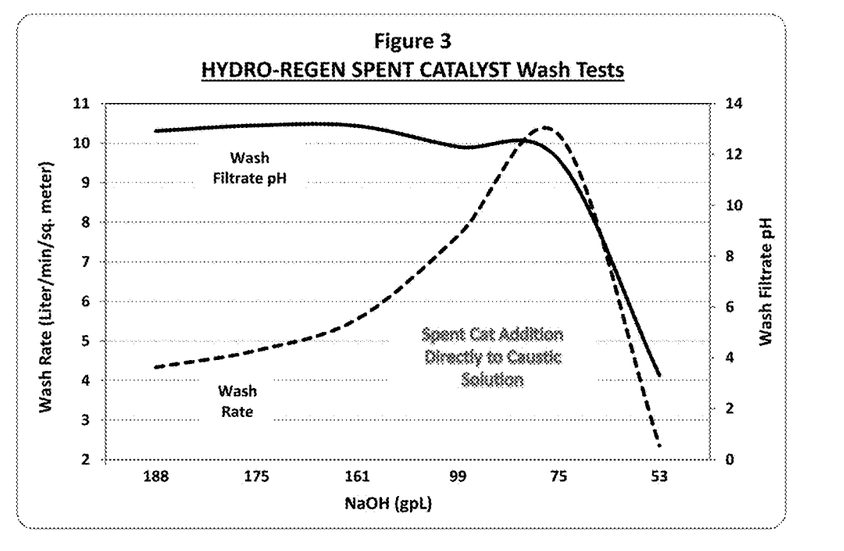
FIG. 3 summarizes the results of experiments of a process using spent catalyst addition directly to caustic solution.

A graph of the results that were obtained in this example is shown in FIG. 3. As shown in FIG. 3, the optimal filtration was obtained at about 75 gm/L NaOH (11.79 wash filtrate pH), with a filter wash flux rate of 9.7 $Lpm/m^2$, and at a washed filter cake thickness of only 4 mm. Compared to Example 3, this procedure used less NaOH solution and gave more effective removal of the chloride from the spent hydro-regeneration catalyst.

At the optimal filtration conditions in this example, followed by additional rinsing with water, 100 wt % of the chloride in the spent catalyst pellets was removed. However, additional rinsing with water produced a lower filter wash flux rate of only 5.8 $Lpm/m^2$.

Example 5

Process Using Spent Catalyst Addition Directly to Caustic Solution, With and Without Filter Aids The spent catalyst pellets described in Example 1 were added directly at 20 wt % solids to 75 gm/L NaOH solutions. Varying amounts of three different filter aids were added to the spent catalyst slurries. The three different filter aids tested were rice hull ash (RHA), MaxFlo®, obtained from Agrilectric Research Company; cellulose, α-Cellulose, obtained from Sigma-Aldrich; and clay, Micro-Sorb® 200 RVM (Regular Volatile Matter), thermally activated and powdered Attapulgite mineral, obtained from BASF. Exotherms of less than 30° C. above ambient temperature were released. The wash filtrate pH was maintained above 11.0. The mixtures of spent catalyst pellets, NaOH solution, and filter aids (when used) were tumbled on a roller unit for 20 minutes, followed by vacuum filtration (3 psia) through a 9 cm. diameter Buchner funnel with 22 micron pore Whatman paper.

The amount of filter aid used in ppmw on a total solids basis, the wt % final solids (combined spent catalyst pellets and filter aid) in the slurry, the filter wash flux rate in liters per minute per square meter of filter area ($Lpm/m^2$), the washed filter cake thickness in mm, the wt % washed filter cake moisture, and the wt % chloride removal that were obtained in this series of experiments are summarized below in Table 8.

TABLE 8

Effect of Filter Aids on Filtration

| Filter Aid Type | Filter Aid ppmw (solids basis) | Final Solids in Slurry, (wt %) | Filter Wash Flux Rate ($Lpm/m^2$) | Washed Filter Cake Thickness (mm) | Cake Moisture, (wt %) | Chloride Removal, (%) |
|---|---|---|---|---|---|---|
| None | 0 | 20.4 | 1.0 | 17.5 | 46.1 | 81.2 |
| RHA | 14,778 | 20.6 | 2.7 | 17.0 | 39.8 | 76.8 |
| RHA | 19,608 | 20.7 | 4.6 | 18.1 | 37.9 | 81.8 |
| RHA | 24,390 | 20.8 | 3.0 | 17.0 | 42.8 | 75.6 |
| RHA | 29,240 | 20.8 | 2.8 | 17.0 | 40.1 | 79.0 |
| RHA | 38,643 | 21.0 | 1.7 | 17.3 | 45.9 | 80.4 |
| Cellulose | 19,608 | 20.7 | 5.8 | 16.9 | 44.2 | 74.6 |
| Cellulose | 24,388 | 20.7 | 5.8 | 17.0 | 40.1 | 79.7 |
| Cellulose | 29,126 | 20.8 | 6.8 | 18.0 | 45.9 | 72.6 |
| Clay | 19,704 | 20.7 | 1.7 | 16.5 | 42.5 | 77.3 |
| Clay | 24,388 | 20.8 | 2.0 | 18.2 | 39.9 | 83.1 |
| Clay | 29,126 | 20.8 | 2.0 | 15.0 | 41.1 | 77.7 |

The experiment conducted using RHA at an amount of 19,608 ppmw was an example of the process wherein: an amount of filter aid added to the wash slurry was greater than 15,000 ppmw, on a total solids basis; the filter wash flux rate was greater than 3.5 to 12 $Lpm/m^2$, the washed filter cake thickness was from greater than 5 mm to 25 mm; the filter cake had a cake moisture content from 30 to less than 50 wt %; and greater than 70% of the chloride in the spent catalyst was removed, prior to any subsequent rinsing of the filter cake.

Figure 4:
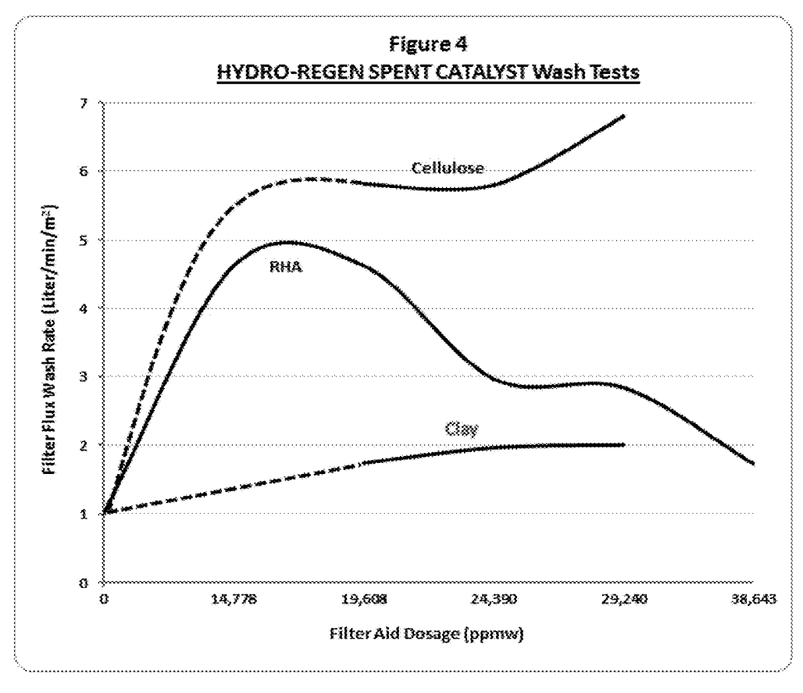
FIG. 4 summarizes the results of experiments of a process using spent catalyst addition directly to caustic solution with different filter aids.

A graph of the results that were obtained in this example is shown in FIG. 4. The results in Table 8 and FIG. 4 show that using a filter aid greatly improved the filter wash flux rate and reduced the filter cake moisture content, without adversely impacting the amount of chloride removal. When the filter aids were used, little to no gelatinous aluminum hydroxide solids were formed and the use of the filter aids also alleviated the generation of spent catalyst fines. In the experiments using filter aids, up to 80 wt % or higher chloride removal was achieved at an estimated raw water consumption of less than 0.55 gallons (2.082 liters) per pound (0.4536 kilogram) of spent catalyst.

The filter cakes produced using the cellulose filter aids were stickier than those produced using the rice hull ash or clay filter aids. It is possible that cellulose filter cakes could have less desirable filter press discharge attributes and handling requirements than those using clay or silica-based (e.g., rice hull ash) filter aids. The cost per pound of cellulose filter aid is additionally an order of magnitude higher than that of rice hull ash. The cost of Attapulgite clay filter aid is about five times higher than that of rice hull ash.

The filter wash flux rates significantly improved to 4.6 Lpm/m2 with the addition of up to 20,000 ppmw (solids basis) or 5,000 ppmw (slurry basis) of the rice hull ash filter aid. The use of the rice hull ash filter aid at an amount from 16,000 to 22,000 ppmw gave an especially good filter wash flux rate of greater than 3.5 Lpm/m$^2$, a filter cake thickness greater than 15.5 mm, a cake moisture less than 40 wt %, and greater than 80% chloride reduction, prior to any subsequent rinsing.

An additional 10 wt % chloride removal was achieved (total 90 wt % chloride removal to less than 3 wt % residual chloride) by rinsing the filter cakes comprising the filter aids with a water rinse. Even with the subsequent water rinse, the total amount of water used to collect the filter cakes averaged to be less than 0.80 gallons (3.028 liters) per pound (0.4536 kilogram) of spent catalyst.

The transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed. Unless otherwise specified, all percentages are in weight percent.

Any term, abbreviation or shorthand not defined is understood to have the ordinary meaning used by a person skilled in the art at the time the application is filed. The singular forms "a," "an," and "the," include plural references unless expressly and unequivocally limited to one instance.

All of the publications, patents and patent applications cited in this application are herein incorporated by reference in their entirety to the same extent as if the disclosure of each individual publication, patent application or patent was specifically and individually indicated to be incorporated by reference in its entirety.

This written description uses examples to disclose the invention, including the best mode, and also to enable any person skilled in the art to make and use the invention. Many modifications of the exemplary embodiments of the invention disclosed above will readily occur to those skilled in the art. Accordingly, the invention is to be construed as including all structure and methods that fall within the scope of the appended claims. Unless otherwise specified, the recitation of a genus of elements, materials or other components, from which an individual component or mixture of components can be selected, is intended to include all possible subgeneric combinations of the listed components and mixtures thereof.

The invention illustratively disclosed herein suitably may be practiced in the absence of any element which is not specifically disclosed herein.

It is claimed:

1. A process comprising:
    a. adding a spent noble metal fixed-bed catalyst comprising one or more noble metals to a caustic solution to wash the spent noble metal fixed-bed catalyst and to make a wash slurry having a pH from 7 to 12.5, wherein the spent catalyst has been in contact with a chloroaluminate ionic liquid catalyst, and wherein the spent catalyst comprises from 5 to 35 wt % chloride; and
    b. filtering the wash slurry and collecting: i) a filter cake having from at least 70 wt % to 100 wt % of the chloride in the spent catalyst removed and having from 90 wt % to 100 wt % of the one or more noble metals retained, and ii) a wash filtrate.

2. The process of claim 1, wherein the spent noble metal fixed-bed catalyst comprises one or more platinum group metals.

3. The process of claim 1, wherein the pH of the wash slurry is from 9 to 12.

4. The process of claim 1, wherein the spent noble metal fixed-bed catalyst has been used for hydro-regeneration of the chloroaluminate ionic liquid catalyst.

5. The process of claim 1, additionally comprising adding a filter aid to the wash slurry.

6. The process of claim 5, wherein the filter aid comprises from 70 to 99 wt % silica.

7. The process of claim 5, wherein an amount of the filter aid added to the wash slurry is from 10,000 to 30,000 ppmw, on a total solids basis.

8. The process of claim 5, wherein filtering of the wash slurry is at a filter wash flux rate of 3.0 to 12.0 Lpm/m$^2$.

9. The process of claim 1, wherein the filter cake has a washed filter cake thickness from greater than 5 to 25 mm.

10. The process of claim 1, wherein the filter cake has a cake moisture content from 25 to 60 wt %.

11. The process of claim 1, wherein an amount of water used to wash the filter cake is from 0.20 to 1.00 gallons of water per pound of the spent catalyst.

12. The process of claim 1, wherein the wash filtrate has a wash filtrate pH from 9.0 to 12.0.

13. The process of claim 1, wherein the spent catalyst is pelleted and has a pellet diameter from 1.0 to 10.0 mm.

14. The process of claim 1, wherein exotherms of up to 40° C. above ambient temperature occur during the adding of the spent catalyst to the caustic solution.

15. The process of claim 1, wherein the filtering uses a filter medium with a pore size from 1 to 100 microns.

16. The process of claim 1, wherein the caustic solution comprises from 40 to 150 grams of sodium hydroxide per liter of water.

17. The process of claim 1, wherein a time between the adding and the filtering of the wash slurry is from 10 to 60 minutes.

18. The process of claim 1, wherein the filter cake comprises from 0 to less than 4 wt % residual chloride.

19. The process of claim 1, additionally comprising rinsing of the filter cake with a water rinse, and wherein a total amount of water used to wash and rinse the filter cake is less than 1.00 gallons per pound of the spent catalyst.

20. The process of claim 1, wherein:
   an amount of a filter aid greater than 15,000 ppmw, on a total solids basis, is added to the wash slurry,
   the filtering of the wash slurry is at a filter wash flux rate of greater than 3.5 to 12 Lpm/m$^2$,
   the filter cake has a washed filter cake thickness from greater than 5 to 25 mm,
   the filter cake has a cake moisture content from 25 to less than 60 wt %, and
   greater than 70% of the chloride in the spent catalyst is removed, prior to any subsequent rinsing of the filter cake.

21. The process of claim 1, additionally comprising recovering the one or more noble metals using a metallurgical extraction technique comprising re-pulping, grinding, and leaching the filter cake in a hot alkaline cyanide solution to provide dissolved platinum group metals, liquid-solid separation of the dissolved platinum group metals, and recovering the dissolved platinum group metals using a strong base anion exchange resin or by cementation with cementation metals comprising aluminum or zinc.

* * * * *